United States Patent
Cazals et al.

(10) Patent No.: US 9,573,693 B2
(45) Date of Patent: Feb. 21, 2017

(54) AIRPLANE HAVING A REAR PROPULSION SYSTEM

(71) Applicant: AIRBUS OPERATIONS S.A.S., Toulouse (FR)

(72) Inventors: Olivier Cazals, Daux (FR); Alexis Manneville, Toulouse (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 701 days.

(21) Appl. No.: 13/963,224

(22) Filed: Aug. 9, 2013

(65) Prior Publication Data
US 2014/0054413 A1 Feb. 27, 2014

Related U.S. Application Data

(63) Continuation of application No. PCT/FR2011/050287, filed on Feb. 11, 2011.

(51) Int. Cl.
   *B64D 27/14* (2006.01)
   *B64C 39/12* (2006.01)
   (Continued)

(52) U.S. Cl.
   CPC ............... *B64D 27/14* (2013.01); *B64C 39/12* (2013.01); *B64D 27/20* (2013.01);
   (Continued)

(58) Field of Classification Search
   CPC ......... B64D 27/10; B64D 27/14; B64D 27/16; B64D 27/20; B64C 5/02; B64C 5/06; B64C 39/12
   See application file for complete search history.

(56) References Cited

U.S. PATENT DOCUMENTS

| 3,341,153 A | 9/1967 | Fatouras |
| 3,936,017 A | 2/1976 | Blythe et al. |
(Continued)

FOREIGN PATENT DOCUMENTS

FR     2655941 A1    6/1991

OTHER PUBLICATIONS

International Searching Authority, International Search Report for International Application No. PCT/FR2011/050287 mailed Nov. 7, 2011.
(Continued)

*Primary Examiner* — Justin Rephann
(74) *Attorney, Agent, or Firm* — Lorenz & Kopf, LLP.

(57) ABSTRACT

An aeroplane comprising a fuselage elongated in a longitudinal direction of the aeroplane is provided. The aeroplane includes a wing attached to the fuselage in a midsection of said fuselage in the longitudinal direction, such that part of the fuselage extends forward of the wing toward a front extremity of the fuselage, and part of the fuselage extends from the rear of the wing toward a rear extremity of the fuselage. A rear fuselage section includes at least one engine attached to the fuselage and located to the rear of the wing. The one or more engines attached to the fuselage are attached in a rear position such that only parts of the aeroplane located in a projection space of the one or more engines attached to the fuselage and the rear fuselage does not include any aerodynamic surfaces intended to assure stability and/or aerodynamic control of the aeroplane.

8 Claims, 3 Drawing Sheets

(51) Int. Cl.
  *B64D 27/20* (2006.01)
  *B64D 27/00* (2006.01)

(52) U.S. Cl.
  CPC .... *B64C 2211/00* (2013.01); *B64D 2027/005* (2013.01); *Y02T 50/66* (2013.01)

(56) References Cited

U.S. PATENT DOCUMENTS

| | | | | |
|---|---|---|---|---|
| 3,954,231 | A * | 5/1976 | Fraser | B64C 3/16 244/225 |
| 4,444,365 | A * | 4/1984 | Heuberger | B64C 1/26 244/131 |
| 4,641,800 | A * | 2/1987 | Rutan | B64C 3/54 244/218 |
| 5,529,263 | A * | 6/1996 | Rudolph | B64C 30/00 244/15 |
| 7,234,667 | B1 | 6/2007 | Talmage, Jr. | |
| 7,472,863 | B2 * | 1/2009 | Pak | A63H 27/14 244/12.5 |
| 7,900,865 | B2 * | 3/2011 | Moore | B64C 39/12 244/1 N |
| 7,926,760 | B2 | 4/2011 | Gall et al. | |
| 8,191,820 | B1 * | 6/2012 | Westra | B64C 9/12 244/207 |
| 2003/0052228 | A1 * | 3/2003 | Sankrithi | B64C 39/04 244/119 |
| 2007/0023571 | A1 * | 2/2007 | Kawai | B64C 39/10 244/119 |
| 2007/0176047 | A1 * | 8/2007 | Moore | B64C 5/08 244/54 |
| 2008/0105781 | A1 * | 5/2008 | Belleville | B64C 11/001 244/51 |
| 2008/0245925 | A1 * | 10/2008 | Udall | B64C 5/02 244/52 |
| 2009/0026308 | A1 | 1/2009 | Olivier et al. | |
| 2009/0065632 | A1 * | 3/2009 | Cazals | B64C 5/02 244/15 |
| 2009/0072079 | A1 * | 3/2009 | Hawley | B64C 15/12 244/54 |
| 2010/0019081 | A1 * | 1/2010 | Cazals | B64C 15/12 244/56 |
| 2010/0044502 | A1 * | 2/2010 | Cazals | B64D 27/20 244/54 |
| 2010/0108802 | A1 * | 5/2010 | Marche | B64C 39/10 244/54 |
| 2010/0264264 | A1 * | 10/2010 | Gall | B64C 3/10 244/1 N |
| 2011/0192663 | A1 * | 8/2011 | Kang | B64C 5/08 180/116 |
| 2012/0091270 | A1 * | 4/2012 | Moore | B64D 27/20 244/1 N |
| 2015/0183519 | A1 * | 7/2015 | Llamas Sandin | B64C 1/1423 244/13 |

OTHER PUBLICATIONS

International Searching Authority, Written Opinion for International Application No. PCT/FR2011/050287 mailed Nov. 7, 2011.

* cited by examiner

AIRPLANE HAVING A REAR PROPULSION SYSTEM

CROSS-REFERENCE TO RELATED APPLICATIONS

This is a continuation of International Application No. PCT/FR2011/050287 filed Feb. 11, 2011, which is incorporated herein by reference in its entirety.

TECHNICAL FIELD

This application pertains to aircraft powered by turbomachines mounted in a rear section of the fuselage, for example civil aircraft or military transport aircraft.

The technical field relates more particularly to an aeroplane having an elongated fuselage, wherein propulsion engines of the turbojet or turboprop type are mounted on the rear of said fuselage.

BACKGROUND

Nowadays in the field of aircraft, an architecture comprising an elongated fuselage in which passengers or cargo are transported and a wing attached to the fuselage in a central portion of the fuselage between the front extremity of the fuselage and the rear extremity of the fuselage is widely used and may be considered conventional.

This conventional architecture is used widely because of the advantages it offers both in terms of both aerodynamics and in operational terms for the aeroplane.

For aerodynamic purposes, the elongated fuselage provides a usable volume that may be substantial while retaining a reduced midship frame, while the aspect ratio may be relatively large, both of these factors helping to limit aerodynamic drag.

Operationally, the elongated shape of the fuselage means that a sufficient number of exits can easily be provided to enable rapid passenger embarkation and disembarkation operations and still ensure the number of emergency exits required according to regulations, since the length on the fuselage occupied by the wing arrangement is moderate relative to the length of the fuselage itself and therefore not obstructive.

Although this conventional architecture is very frequently used in the field of transport aircraft, it still comprises two quite distinct families in respect of the propulsion engines.

In the first family, the propulsion engines are mounted under the wing, most often two or four engines are disposed symmetrically relative to the fuselage, as with the Airbus A320 (two engines) or A380 (four engines) for example, and in a second family the propulsion engines are mounted at the rear and on either side of the fuselage, as on the SE210 Caravelle aeroplane, for example, and possibly inside or above the fuselage.

In order to deliver the thrust required by transport aircraft, as soon as the mass of the aeroplane exceeds a few tens of tons, the engines used are turbojet engines or turboprop engines having turbines as power generators, and which most often entail the use of blowers with a large diameter or propellers with varying degrees of complexity.

In order to contain debris, which may arise during the operation of the engine, designers occasionally resort to shielding, which is fitted around ducted rotating parts such as blowers, but when the energy involved is considerable this method of containing engine debris becomes impractical, that is to say the additional weight becomes unacceptable.

In order to prevent sensitive parts of the aeroplane from being damaged, for example the parts containing flight controls or vital structures, the engines are located in such positions that the possible trajectories of the engine debris cannot bring it into contact with said sensitive parts or cause damage that would endanger the aeroplane.

In the case of engines mounted at the rear of the aeroplane, the problem is more difficult to address due to the concentration of flight controls in the rear section of the fuselage, which is relatively small and is also where the aeroplane empennages are located in conventional architectures, the horizontal and vertical stabilising empennages.

Nowadays, designers have overcome the problems of installing rear jet engines by a positioning, particularly a longitudinal positioning of the jet engines that is limiting but possible due to the relatively small dimensions of said jet engines, and/or because the energy of debris that might be associated with the engine is limited, and by multiplying the flight control systems.

Unfortunately, the appearance for various reasons of engines that have rotating parts with larger diameters, particularly engines with unducted counter-rotating propellers, which in some respects seem to be simpler to install at the rear of the fuselage than under the wing, simply reintroduces the problem of dealing with debris.

The designs for installing such engines consist in known manner of replacing the conventional jet engines with these engines by adapting the support pylons whose function is to ensure a distance between the axis and the engine according to the diameter of the rotating parts, as in U.S. Pat. No. 5,443,229, for example, but these solutions are able to simply contain the consequences of the breakup of a rotating part of the engine, which is likely to cause damage to the aeroplane flight control systems, particularly the rear empennages or a section of the structure of the empennages or the rear fuselage, damage that must then be taken into account at the design stage.

The implementation of such solutions is therefore very expensive and complex, and is the source of various less than optimal conditions, particularly in terms of weight and aerodynamics.

In addition, other objects, desirable features and characteristics will become apparent from the subsequent summary and detailed description, and the appended claims, taken in conjunction with the accompanying drawings and this background.

SUMMARY

The various teachings of the present disclosure provide an aeroplane architecture that offers an optimized solution for the installation of turbine engines that are attached to the rear of an aeroplane fuselage and permits the aeroplane designer to define an installation of engines that are attached to the rear of the fuselage without being bound by the known constraints on conventional aeroplanes in order to resolve the considerations of the safety of the systems and flight controls.

For this purpose, the aeroplane according to the present disclosure comprises a fuselage that is elongated along a longitudinal axis X of the aeroplane, a wing that is attached to the fuselage at a midsection of the fuselage along the longitudinal direction in such manner that a section of the fuselage extends forward of the wing toward a forward extremity of the fuselage and extends to the rear of the wing toward a rear extremity of the fuselage, and comprises a rear section of the fuselage astern of the wing and toward the rear extremity, also called the rear fuselage, on which one or more engines are mounted behind the wing. The rear fuselage is also entirely without aerodynamic surfaces designed to assure the stability or aerodynamic control of the aeroplane, or at least without such aerodynamic surfaces as would be necessary to assure stability or aerodynamic control of the aeroplane, wherein this condition applies at least to the areas of the rear fuselage that are located within a possible projection space for engine debris, all said aerodynamic surfaces advantageously being located in a section forward of the engines and of the possible projection space of debris therefrom.

Thus, in the event that an engine breaks up resulting in the projection of debris while the aeroplane is in flight, the engine debris that is projected will not reach the aerodynamic surfaces, thereby avoiding any risk of damaging said aerodynamic surfaces or the equipment thereof that might affect the stability and control of the aeroplane.

Moreover, the vibration associated with an unbalanced engine that is caused to windmill by the movement of the aeroplane through the air is not transferred directly to the aerodynamic surfaces, so that said aerodynamic surfaces do not have to be overdimensioned in order to address such a flight situation, which also means that the function of said aerodynamic surfaces is not impaired by increased vibration and thereby also limits the effect of such vibration on the flying characteristics of the aeroplane.

In order to ensure stability and pitch control of the aeroplane, the aerodynamic surfaces that provide the stability and aerodynamic control of the aeroplane about the pitch axis are advantageously fixed permanently to the fuselage in a position on the fuselage that is longitudinally forward of the wing.

Given the position of the engines at the rear of the fuselage, said aerodynamic surfaces, for example a forward empennage also called a canard, are still located at a distance from the debris projection zones and thus perfectly safe in the event that an engine disintegrates.

In order to ensure stability and yaw control of the aeroplane, the aerodynamic surfaces that provide the stability and aerodynamic control of the aeroplane about the yaw axis are advantageously disposed on the wing tips, situated beyond the possible projection space of engine debris.

The aerodynamic surfaces thus located at the wingtips, for example in the form of winglets dimensioned and shaped to provide the desired stability and equipped with elevators for controlling the aeroplane about the yaw axis, are not in danger of being damaged by projected debris in the event that an engine disintegrates.

In order to ensure stability and roll control of the aeroplane, the aerodynamic surfaces that provide the stability and aerodynamic control of the aeroplane about a roll axis are ailerons located on the trailing edges of the wings and attached permanently to the wings in a zone situated beyond the possible projection spaces of engine debris.

In one exemplary embodiment, the ailerons comprise a method for generating controlled aerodynamic drag to provide aerodynamic control of the aeroplane about a yaw axis of the aeroplane.

Thus, the ailerons, for example of the crocodile type, are involved in controlling the aeroplane about the yaw axis in addition to or instead of the wingtip aerodynamic surfaces that are dedicated to the stability and yaw control of the aeroplane.

The engines of the aeroplane according to the various teachings of the present disclosure are advantageously jet engines or turboprop engines with front-mounted propellers or rear-mounted propellers.

With such engines, the suggested arrangement avoids any danger that the aerodynamic surfaces might be located in the trajectories of debris having such potential energy that attempting to stop or control such debris would have detrimental effects.

One exemplary embodiment of the aeroplane comprises two engines, one on each side of the fuselage and mounted on the rear fuselage in an arrangement that is substantially symmetrical relative to a vertical plane of the aeroplane reference, and optionally further comprises a third engine mounted above the fuselage on the rear fuselage and substantially in the vertical plane of the aeroplane reference to satisfy the thrust needs of the aeroplane and regulatory requirements if necessary.

The position in the longitudinal direction of the wing on the fuselage and the geometric sweep of the wing are calculated such that none of the aerodynamic surfaces fixed on the wing is located in the engine debris projection space.

By selecting these geometric wing parameters appropriately, it is possible to meet the requirements for centring and cruising speed desired for the aeroplane and still satisfy the condition to the effect that the aerodynamic surfaces are not in danger of being damaged by projected debris if the engine breaks.

The present disclosure also relates to a method for manufacturing an aeroplane corresponding to the preceding description, in which a part of the aeroplane structure, comprising the aeroplane structure without the rear fuselage, is produced separately from the rear fuselage, and in which a rear fuselage, which may vary from one aeroplane to another and corresponds to a given engine type, is assembled with the part of the aeroplane structure depending on the engine configuration desired for the aeroplane that is being built.

This method thus enables the creation of an industrial aircraft production unit in which aircraft that differ according to the type of engine with which they are equipped are manufactured using means and structural elements that are largely common to all.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
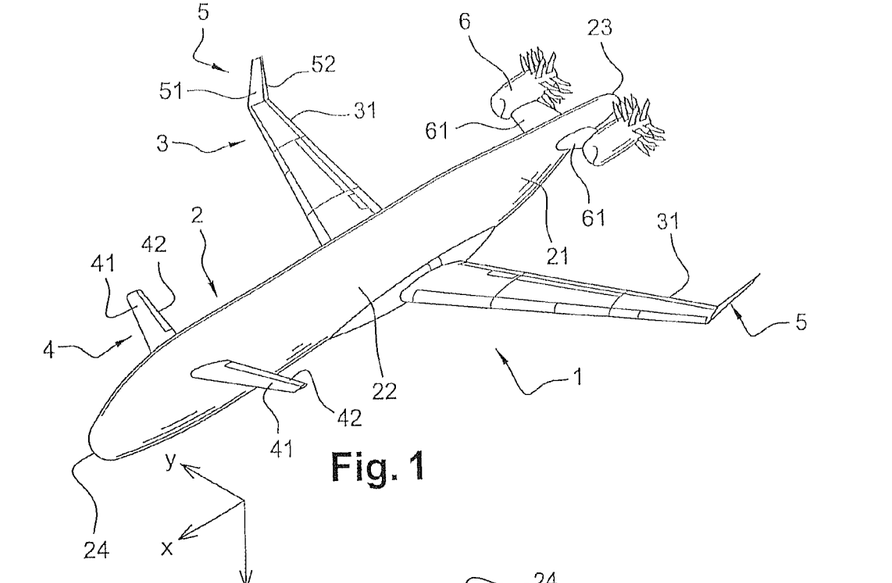
FIG. 1 is a perspective view of an exemplary aeroplane according to various embodiments.

FIG. 1 shows an aeroplane 1 comprising primarily a fuselage 2 and a wing 3 according to known, conventional arrangement.

The illustration of aeroplane 1 is related to the extent necessary for the description with a conventional reference defined by three orthogonal directions:
- a direction X parallel to a longitudinal axis of the aeroplane, parallel to an axis of the fuselage, aligned positively towards the front of the aeroplane in the direction of displacement during flight;
- a direction Z perpendicular to direction X and aligned positively toward the bottom of the aeroplane when the aeroplane is flying horizontally;
- a direction Y perpendicular to a plane XZ defined by directions X and Z, aligned positively toward the right side of the aeroplane. Expressions that relate to position or direction in this description have the common meaning that they have in an orientation of the aeroplane, in particular:
- front or toward the front indicates in the direction of positive X, and rear or toward the rear indicates in the direction of negative X;
- below or downward indicates in the direction of positive Z, and above or upward indicates in the direction of negative Z;
- on the right or toward the right indicates in the direction of positive Y, and on the left or toward the left indicates in the direction of negative Y, on one side may refer either to the positive or negative Y without distinction, depending on the case.

In keeping with the conventions that are observed in the field of aircraft design, in the case of rotation or torque reference is made to roll angles about an axis of roll rotation of the aeroplane parallel to direction X, pitch angles about an axis of pitch parallel to direction Y, and yaw angles about a yaw axis parallel to direction Z.

In typical manner for transport aircraft, fuselage 2 of the aeroplane is elongated in a longitudinal direction of said fuselage parallel to direction X.

Wing 3 is attached in a midsection 22 of the fuselage along the length thereof, that is to say one part of the fuselage extends in front of the wing toward a front extremity 24 of the fuselage, and another part extends to the rear of the wing in the direction of a rear extremity 23 of the fuselage, and the wing does not necessarily have to be located equidistantly between said front and rear extremities.

In the example shown in FIG. 1, wing 3 is also attached to the lower part of the fuselage, midsection 22 of which is substantially cylindrical.

As shown in FIG. 1, aeroplane 1 of the various teachings of the present disclosure also comprises a front horizontal empennage 4, which is attached to the fuselage in front of the wing according to a configuration called a canard. Front horizontal empennage 4 comprises a first part 41 which is either fixed substantially horizontally or with variable offset relative to the fuselage and extends substantially symmetrically along each side of the fuselage and which has elevators 42 attached in hinged manner to the trailing edges thereof.

The tips of wing 3 are furnished with yaw stabilisers 5.

Each yaw stabiliser 5 comprises primarily an aerodynamic surface that is substantially vertical or at least sufficiently inclined with respect to a horizontal plane XY of the aeroplane reference to serve as a significant component of an aerodynamic force generated by the yaw stabiliser in direction Y when the aeroplane is subject to aerodynamic slippage not equal to zero.

Each yaw stabiliser 5 comprises a fixed front part 51 and a yaw control surface 52 attached in hinged manner to the trailing edge of the stabiliser.

Wing 3 also comprises ailerons 31 on a trailing edge of said wing, implemented to control the aeroplane about the roll axis.

Optionally, each aileron 31 comprises a method for generating controlled aerodynamic drag independently of the desired local lift of the aileron to control roll, for example by means of a crocodile type control surface, such that a control torque is generated about the yaw axis by creating aerodynamic drag values that differ between the right side of the wing and the left side thereof.

The use of this functionality enables optional implementation of yaw stabilisers 5 comprising smaller yaw control surfaces 52, in certain cases it may even be possible to dispense with the yaw control surface entirely.

Two engines 6 are mounted in a rear section 21 of fuselage 2, called the rear fuselage, behind wing 3 and towards rear extremity 23.

Each engine 6 is mounted on one side of the fuselage, relatively close to rear extremity 23 of the fuselage, by means of a support pylon 61.

Rear fuselage 21 corresponds substantially to a part of the fuselage in which the right sections par are tapered in longitudinal direction X from the substantially cylindrical midsection 22 as far as rear extremity 23 of the fuselage.

According to the various teachings of the present disclosure, rear fuselage 21 does not comprise any aerodynamic surface nor any aerodynamic control surface necessary to stabilise or provide aerodynamic control of the aeroplane, and in the case shown in the figures, rear fuselage 21 effectively has no aerodynamic surfaces that are intended to provide stability or aerodynamic control for the aeroplane, even if in addition to the specialised shapes of the fuselage, the support pylons for the engines, or even the engine nacelles inevitably have an impact on stability, which although taken into account by the aeroplane designer, are not essential to the stability of the aeroplane.

Thus, the aeroplane according to the present disclosure does not comprise any of the empennages that are associated with the rear fuselage in the conventional architectures.

In aeroplane 1 according to various embodiments, both the total surface and the dimensions of the elevators of front empennage 4 are dimensioned to assure pitch stability and pitch control of the aeroplane, and yaw stabilisers 5 and the associated yaw control surfaces 52 and/or the crocodile ailerons where applicable are dimensioned to assure stability and yaw control of the aeroplane.

It should be noted that, in practice, the need to maintain each of the rear engines 6, at least for certain engine types, including propeller engines, at a certain distance from rear fuselage 21 requires the use of support pylons 61, the shape of which, in order to reduce aerodynamic drag, also has a secondary effect on longitudinal stability, but the suppression of this effect does not significantly affect longitudinal stability.

For optimisation purposes, front empennage 4 is advantageously dimensioned taking into account the longitudinal stabilising effect of support pylons 61 when the aeroplane is in a normal configuration yet making allowance for degraded yet acceptable stability in terms of flight and comfort qualities, which would ensue if the support pylons were damaged.

The absence of empennage structures in the zone of rear fuselage 21 and of the installation of the many systems relating to flight controls associated with the empennages enables a rear fuselage structure to be produced that is both lighter and stronger than in the conventional aeroplane architectures.

The design freedom created thereby regarding the structure of the extreme rear section also makes it possible to make junctions between support pylons 61 and rear fuselage 21 that are able to damp vibration both during normal operation of the engines to diminish the transfer of vibration and noise to the fuselage, and in the event that a rotating part of the engine becomes significantly unbalanced.

This phenomenon of unbalance in engines comprising large diameter blades, such as turbofans or high-speed turbopropeller engines, must be considered carefully.

In fact, if a fan or propeller blade or part thereof is lost, even after it has shut down the engine is most often caused to continue rotating in flight by the air flowing through it, in an action called "windmilling". The unbalance of the rotating parts of the engine then causes significant vibration, which may be capable of interfering with the structure and the proper operation of the systems.

In the aeroplane according to the various exemplary embodiments of the present disclosure, such vibration has little effect on the stability and control of the aeroplane because there are no empennages corresponding to these functions on rear fuselage 21, and additionally the implification of the system arrangements in said rear fuselage makes it easier to attach engine pylons by means of high-performance vibration dampers.

In the arrangement of the engines on the aeroplane according to the present disclosure, none of the aerodynamic surfaces, whether they are attached to the fuselage or the wing (front empennage 4 and yaw stabilisers 5), nor any aerodynamic control surface (elevators 42, yaw control surfaces 52 and ailerons 31 on the wing) is located in a zone that falls within a projection space 62 of engine debris that is capable of being projected in the event of an engine breakage.

Figure 2:
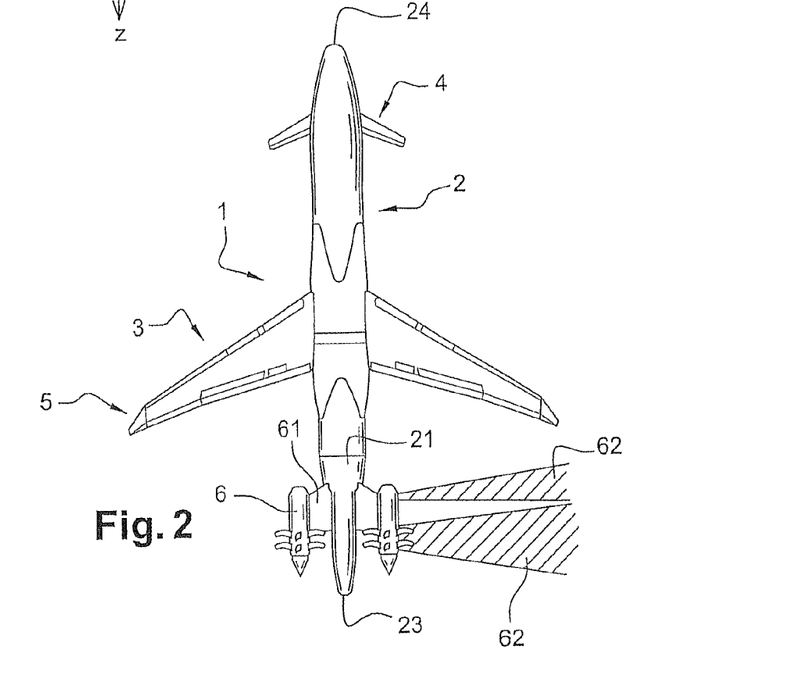
FIG. 2 is a top view of the aeroplane of FIG. 1 showing the possible debris projection zones in the event of an engine malfunction.

Projection spaces 62 of engine debris in the event of a breakage are in fact known and are represented by spaces corresponding to projection cones associated with the various rotating parts of the engine as illustrated in FIG. 2.

Such projection spaces are most often represented by conically shaped zones that reflect the possible divergence angles of debris from rotating parts of the engine relative to a radial plane of each of said rotating parts.

A person skilled in the art of designing propulsion installations for aircraft is very familiar with the positioning of these spaces relative to an engine, positions that are included in the characteristics of the engine that the engine designer determined for example on the basis of experimental data and nowadays using numerical simulation tools.

Since in the aeroplane of the present disclosure all of the sensitive elements concerned with stabilising and controlling the aeroplane are located outside the zones that are at risk of damage from projected debris in the event of an engine breakage, the design of the aeroplane controls tasked with assuring stability and of the aeroplane controls themselves is simplified thereby.

Firstly, the constraints governing the separation of power lines (hydraulic, electrical) and control lines (electrical buses, optical buses, and so on) are much less stringent since the paths of these line do not have to avoid passing through risk zones with respect to engine breakages. This advantage is reflected clearly in the architecture used, in which only the rearmost section of the fuselage is potentially exposed to projections, and due to the fact that no sensitive element is located in this zone or to the rear of this zone.

Secondly, the configuration of the control elements themselves, particularly the moving surfaces used for flight controls and the actuators thereof, which must be able to sustain failures for classic safety reasons, can be designed and produced much more easily, and this has a positive effect on the cost and weight of such elements.

The control surfaces for example, e.g., a direction control surface, which must be produced in two parts in a conventional architecture, can be manufactured as a single component in the aeroplane according to the various teachings of the present disclosure.

The aeroplane of the present disclosure represented in FIG. 1 is able to assume various forms of architecture that conform to the principles of the present disclosure.

The configuration of the wing may differ from that of the aeroplane shown in FIG. 1.

Figure 3A:
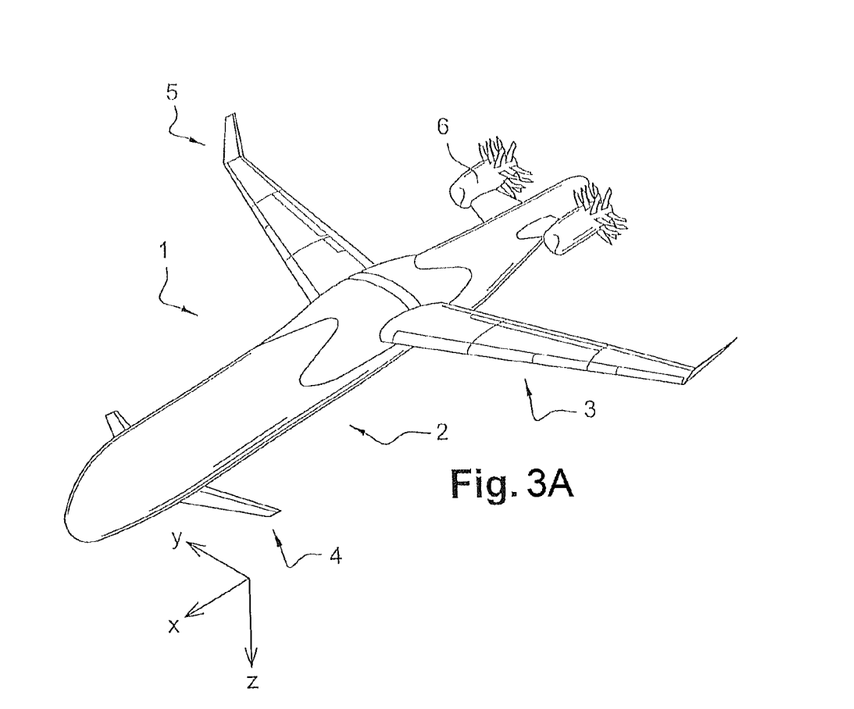
FIG. 3A is a perspective view of an exemplary aeroplane according to various embodiments differing from the aeroplane of FIG. 1 in that the wing arrangement is high and the front empennage is low.
Figure 3B:
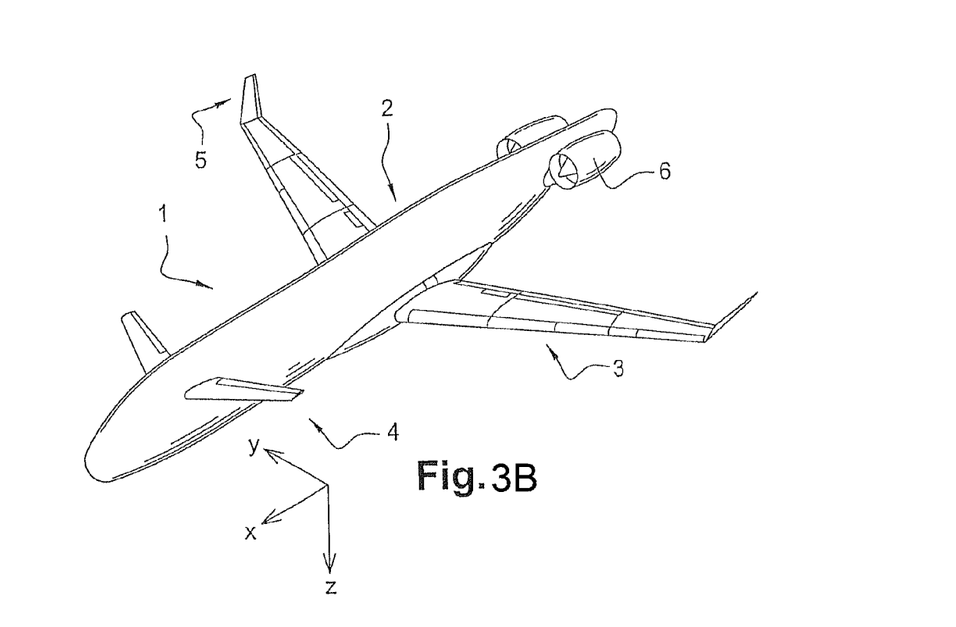
FIG. 3B is a perspective view of an exemplary aeroplane according to various embodiments differing from the aeroplane of FIG. 1 in that it is configured with jet type engines.

For example, wing 3 may be in a high position relative to fuselage 2, as in the example of the aeroplane of FIG. 3A.

The wing may also be endowed with various aerodynamic configurations such as a sweep geometry of substantially zero or a forward swept wing, that is to say that the wingtips are offset toward the front, in front of the wing root on the fuselage in the aeroplane reference, such configurations are not shown here. In these variations of this exemplary embodiment, no part of wing 2 is located in an projection space 62 of debris in the event of an engine breakage.

In practice, the sweep geometry of the wing is limited toward the rear depending on the position of the wing relative to the fuselage by the debris projection spaces.

Horizontal front empennage 4 may also be configured differently to according to the requirements specific to the aeroplane that must be satisfied, particularly aerodynamic requirements, structural requirements, and restrictions on the movements of people and particularly vehicles around the aeroplane on the ground.

Horizontal front empennage 4 is mounted for example in a low position on fuselage 2, as in the configuration shown in FIG. 3A, and its sweep may be positive in FIG. 1 and FIG. 3A, zero or negative according to configurations that are not shown, and in all cases horizontal front empennage 41 and the elevators 42 thereon are outside of projection spaces 62 of debris from the engines that are located at the rear of the fuselage.

The horizontal front empennage may also have different geometries particularly in terms of sweep, elongation or taper.

The aeroplane of the present disclosure may also incorporate different engine types corresponding to various configurations.

Figure 4:
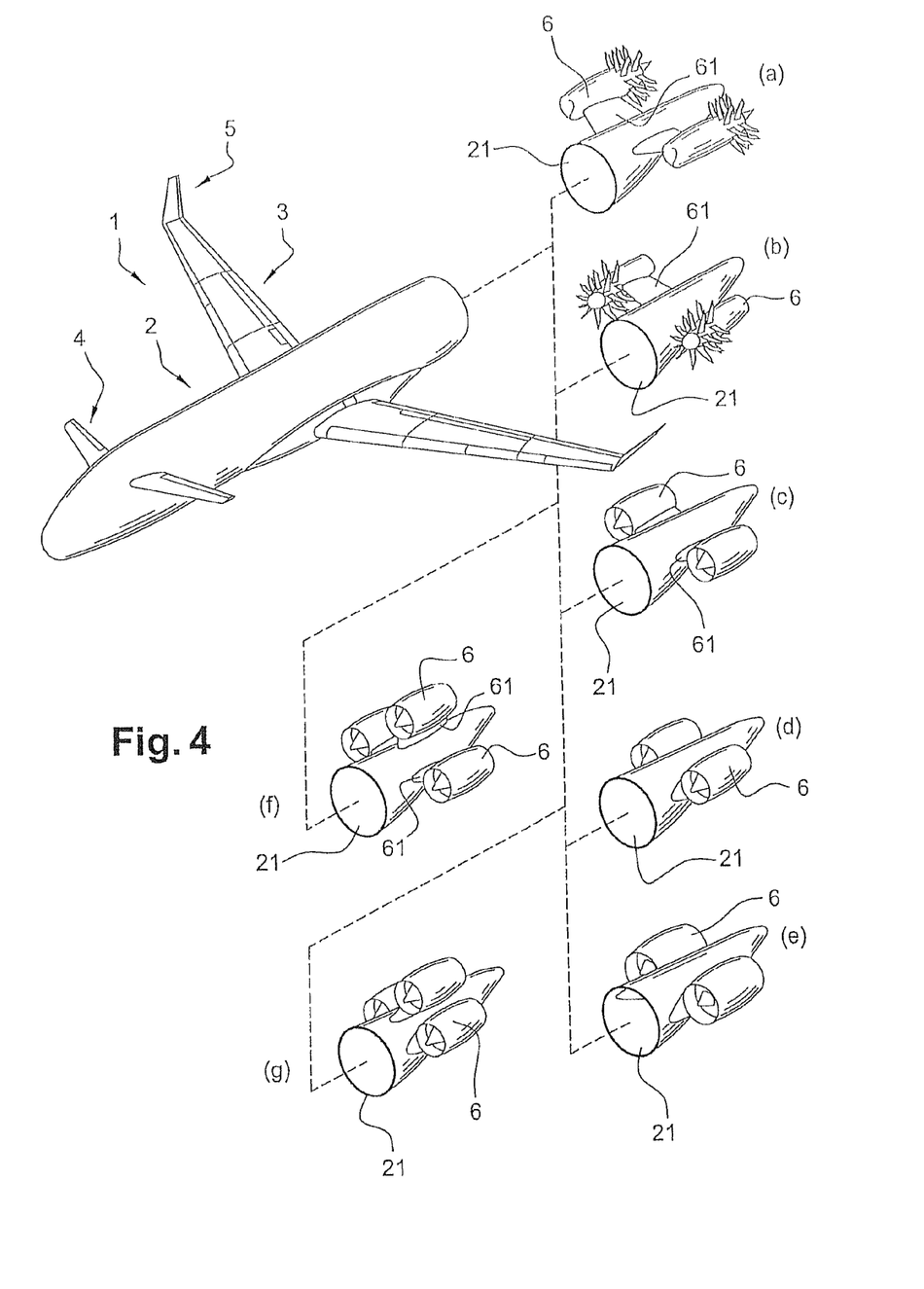
FIG. 4 and insets (a) to (g) are a perspective view of an aeroplane section without the rear fuselage, corresponding to the aeroplane of FIG. 1, and of various rear fuselages that may be adapted to the front section using different types or different numbers of engines.

FIG. 4 illustrates, in non-limiting manner, various arrangement types and propulsion systems as exemplary embodiments of the present disclosure.

Accordingly, on the same one or a similar aeroplane as FIG. 1 except for the rear fuselage 21 shown in FIG. 4, the rear fuselage may be equipped with:

FIG. 4, inset (a): high-speed turboprop engines located at the rear of the engine, as on the aeroplane of FIG. 1;

FIG. 4, inset (b): high-speed turboprop engines located at the front of the engine;

jet engines of various diameters, which are advantageously installed in configurations more or less integrated in the fuselage depending on a width at the midship frame of the jet engines in question:

FIG. 4, inset (c): jet engines with a relatively small diameter relative to the fuselage, attached to the fuselage by support pylons that are visible outside the fuselage;

FIG. 4, inset (d): jet engines with a medium diameter and mounted substantially flush with the fuselage;

FIG. 4, inset (e): jet engines with a large diameter relative to the fuselage and arranged in a configuration referred to as semi-embedded in the fuselage.

In a configuration that is not shown, a single engine in mounted on the rear fuselage.

For various reasons, to increase total thrust or to comply with regulatory requirements, a third engine may be mounted on the rear of the fuselage, above the fuselage and substantially in a vertical plane of symmetry of the aeroplane, in similar manner to the other engines such as in the example of FIG. 4, inset (f), corresponding to a triengine version of the arrangement of FIG. 4, inset (c), and that of FIG. 4, inset (g), corresponding to a triengine version of the arrangement of FIG. 4, inset (d).

In practice, the number of engines, the engine types, the size of the engines and their mounting on the fuselage may represent all possible combinations within the limits of what is materially practicable.

For example, medium-sized engines, whether turboprop or turbojet engines, may be attached to the sides of the fuselage in a configuration on support pylons to ensure optimized cruising propulsion, and they may be associated with a jet engine having a larger diameter and arranged on top of the fuselage in an embedded configuration to minimise drag when cruising and to provide additional thrust at take-off.

Whatever the engine type and the number of engines used, the architecture of the aeroplane according to the various embodiments of the present disclosure offers a solution to the problem of potential projected engine debris with regard to the aerodynamic stabilization and control surfaces and the systems associated therewith.

This architecture thus provides the designer of the aeroplane considerable freedom in terms of choosing the engine type, and improved flexibility in the precise positioning of each engine.

Moreover, by separating the critical aspects of engine debris projections from those of designing the aeroplane systems and particularly the stability and aerodynamic control systems, it becomes possible to conceive of an aeroplane in which the propulsion means may be modified fundamentally without compromising the configuration of the other systems.

The choice of engine type in an aeroplane may thus be reconsidered at a later time in the aeroplane design process.

The same aeroplane production line may build models that used different engine types, since the implications for assembly of the structure are in this case limited to those of the choice of a model for the rear extremity. For example, a turbojet version and a turboprop engine may be built on the same assembly line.

It should be noted that the present disclosure is not limited to the detailed examples illustrated and described in the preceding.

In particular, the various arrangements of the wing and the horizontal empennage that are possible may be combined according to the unique aerodynamic requirements of a given aeroplane.

Other arrangements are also possible for the yaw stabilisers, such as aerodynamic surfaces that are substantially vertical arranged on the wings in intermediate positions between the fuselage and the wing tips, in principle in a symmetrical arrangement but not necessarily limited to one surface on each side of the fuselage.

The suggested shape of the fuselage is also capable of many different variations without exceeding the scope of the present disclosure, for example in terms of the progression of the fuselage sections from the front of the fuselage to the rear.

Accordingly, the aeroplane of the various teachings of the present disclosure is equipped with all means necessary to assure the control and stability thereof for many propulsion system types without the need to implement specific means to protect a given aeroplane and the systems thereof from the risks of debris projections or excessive vibration if an engine begins windmilling after it is damaged and shut down.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. An aeroplane comprising:
a fuselage elongated in a longitudinal direction of the aeroplane, including a wing attached to the fuselage in a midsection of said fuselage in the longitudinal direction, such that part of the fuselage extends forward of the wing toward a front extremity of the fuselage, and part of the fuselage extends to the rear of the wing toward a rear extremity of the fuselage, and including a rear fuselage section, having at least one engine attached to the fuselage and located to the rear of the wing,
wherein the at least one engine is attached to the fuselage in a rear position and the rear fuselage section does not include any aerodynamic surfaces intended to assure at least one of stability and aerodynamic control of the aeroplane;
wherein the aerodynamic surfaces for at least one of aerodynamic stabilisation and control of the aeroplane are located outside of a projection space for engine debris associated with the at least one engine.

2. The aeroplane according to claim 1, in which aerodynamic surfaces for at least one of aerodynamic stabilisation and control of the aeroplane about a yaw axis of the aeroplane are arranged on the tips of the wing.

3. The aeroplane according to claim 2, in which aerodynamic surfaces for aerodynamic control of the aeroplane about a roll axis of the aeroplane are ailerons arranged on the wing, on the trailing edge of the wing, outside of the projection space.

4. The aeroplane according to claim 3, in which the ailerons generate controlled aerodynamic drag to provide aerodynamic control of the aeroplane about an axis of yaw of the aeroplane.

5. The aeroplane according to claim 1, in which the at least one engine is a jet engine or a turboprop engine with front- or rear-mounted propellers.

6. The aeroplane according to claim 5, wherein the at least one engine further comprises two engines, one engine on each side of the fuselage and located on the rear fuselage according to a substantially symmetrical arrangement relative to a vertical plane in the aeroplane reference.

7. The aeroplane according to claim 6 further comprising a third engine located above the fuselage on the rear fuselage, substantially in the vertical plane of symmetry of the aeroplane reference.

8. The aeroplane according to claim 1, wherein one or more of the aerodynamic surfaces are permanently attached to the wing, and a position on the fuselage of the wing in the longitudinal direction and a sweep of the wing are determined such that none of the one or more aerodynamic surfaces permanently attached to the wing are located inside the projection space for engine debris.

* * * * *